July 14, 1925.

L. M. WOOLSON

SHOCK ABSORBER FOR MOTOR VEHICLES

Filed July 29, 1920

Inventor:
Lionel M. Woolson

By Milton Tibbetts, Atty.

Patented July 14, 1925.

1,545,933

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

SHOCK ABSORBER FOR MOTOR VEHICLES.

Application filed July 29, 1920. Serial No. 399,670.

*To all whom it may concern:*

Be it known that I, LIONEL M. WOOLSON, a citizen of the United States, and resident of Detroit, Wayne County, State of Michigan, have invented certain new and useful Improvements in Shock Absorbers for Motor Vehicles, of which the following is a specification.

This invention relates to motor vehicles and more particularly to shock absorbers for such vehicles.

One of the objects of the invention is to absorb shocks occasioned by the relative movement of the vehicle frame and axle either toward or away from each other.

Another object of the invention is to provide a construction of the character described that will be simple and rugged in construction and will have a minimum number of parts.

Another object of the invention is to provide a construction that may be easily assembled and taken apart.

Further objects will appear from the following specification taken in connection with the drawings which form a part of this application, and in which.

Figure 1:
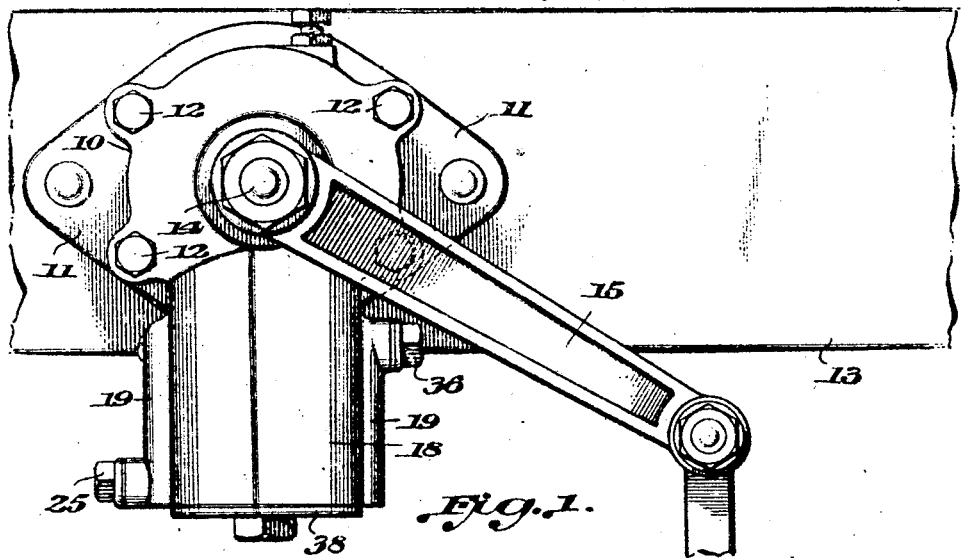
Fig. 1 illustrates a shock absorber constructed in accordance with my invention, and shown in connection with the frame and axle of a motor vehicle.

The shock absorber, as illustrated in the drawings, comprises a casing 10 secured to a plate or bracket 11 by means of bolts 12, the plate 11 being secured to the frame 13 of a motor vehicle. A rock shaft 14 is journaled in the casing 10 and in the plate 11, and has secured to one end thereof an arm 15, the opposite end of this arm being connected by a link 16 to an axle 17 of the vehicle.

The lower portion of the casing 10 has formed therein a cylinder 18, and the casing also has formed therein or secured thereto a pair of annular conduits 19 and 19', the conduit 19 communicating at its upper end, as shown at 20, with the interior of the cylinder and at its lower end with conduit 21, the connecting conduit 21 being normally closed from communication with the conduit 19 by means of a ball valve 22, the latter being actuated by a spring 23 seated at one end on the ball and at its opposite end on a removable plug 24. A screw-threaded plug 25 is carried by the casing at the lower end thereof and gives access to the ball valve just described.

A hollow piston 26 is reciprocably mounted in the cylinder 18, the upper end of this piston being closed by a screw-threaded cap 27 having air vents 28 formed therein. The lower end of the piston 26 is provided with a packing member 28 for preventing the passage of oil past the piston. The lower wall or bottom of the piston 26 has formed therein a restricted opening 29 for permitting the passage of fluid or oil upwardly into the interior of the piston as the piston is forced downwardly in a manner hereinafter described. The cylindrical outer wall of the piston is provided with an annular recess or cut-away portion 30, this portion of the piston communicating with the interior of the piston through a plurality of openings 31 formed in the wall of the piston.

Figure 2:
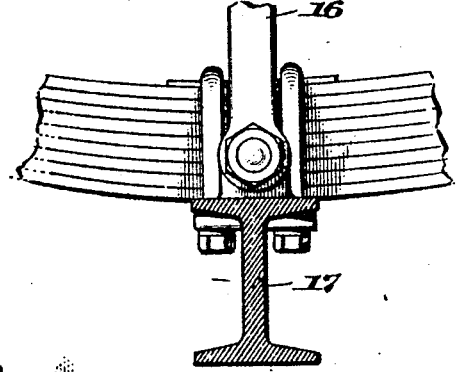
Fig. 2 is a vertical sectional view of the shock absorber shown in Fig. 1.
Figure 3:
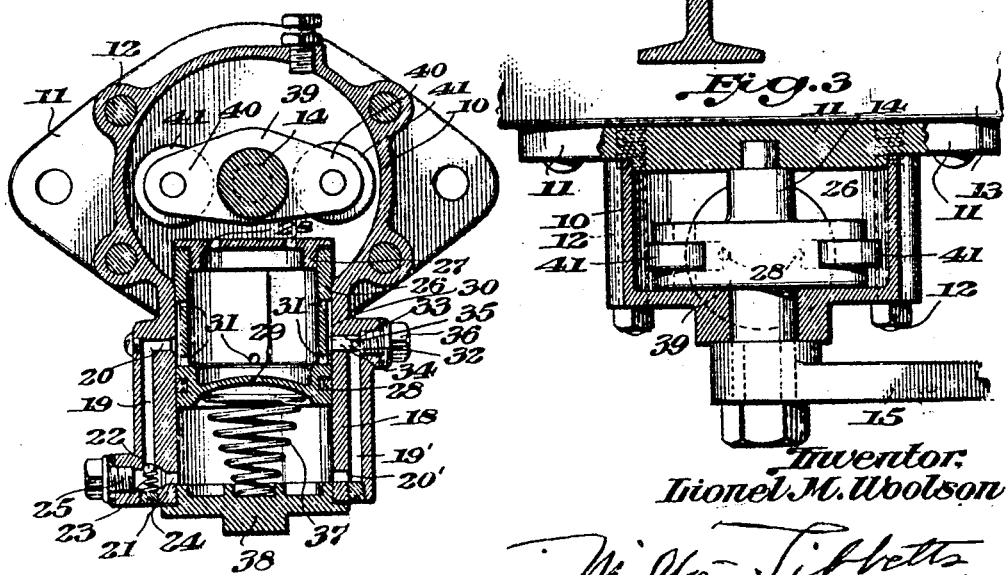
Fig. 3 is a transverse sectional view taken at right angles to Fig. 2.

In order to regulate the rate of flow of the oil from the interior of the cylinder into the conduit 19', and through this conduit to an opening 20' in cylinder 18, an intermediate conduit 32 is mounted in an opening 33 formed at the upper end of the cylinder at one side thereof, as shown in Fig. 2, this conduit 32 having a longitudinal opening 34 communicating with the interior of the cylinder and a lateral opening 35 communicating with the opening 34 and with the conduit 19'. The conduit 32 is secured to or formed integral with the plug 36, which is screw-threaded into the casing 10 and may be easily removed therefrom, should it be desired to substitute another plug with openings of different sizes for the purpose of regulating the rate of flow of the fluid into the annular conduit 19.

A spring 37 engages the bottom of the piston at one end and at its opposite end engages a cap 38 threaded into the lower end of the cylinder 18 and forming the end wall thereof.

In order to actuate the piston in a downward direction, when the motor vehicle frame and axle are displaced relatively to each other, I have secured to the rock shaft 14 a member 39 having oppositely extending arms 40, rollers 41 being rotatably mounted in these arms. From the preceding description it will be seen that the rotation of the rock shaft in either direction will cause one of the rollers 41 to engage the upper wall of the piston and force this piston downwardly.

The shock absorber described in the above specification operates as follows: When the vehicle frame and axle are displaced relatively to each other, the rock shaft 14 is rotated in one direction or the other, thereby causing the engagement of one of the rollers 41 with the piston and forcing the piston downwardly into the cylinder. Assuming that the cylinder is substantially filled with oil, this oil will be forced by the downward movement of the piston through the restricted opening 29 into the interior of the hollow piston. As the frame and axle return to their normal relative position, the spring 37 will cause the piston to return to the upper position, shown in Fig. 2, and the oil within the interior of the piston will pass outwardly through the openings 31 into the annular opening or recess 30, and thence through the conduits 19 and 19' and into the lower portion of the cylinder 18, the ball valve 22 being forced from its seat as the oil returns to the lower portion of the cylinder.

From the above description it will be evident that the shock absorber described comprises very few parts and is simple and rugged in construction and is well adapted to efficiently perform the functions for which it was devised.

Although one specific embodiment of the invention has been illustrated and described, it will be understood that changes and modifications in the construction and in the arrangement of the various cooperating parts may be made without departing from the spirit or scope of the invention as expressed in the following claims.

Having described my invention, what I claim and desire to secure by Letters Patent is:—

1. A shock absorber comprising a cylinder and a piston therein, by-pass means around the piston head affording appreciable fluid resistance to inward movement only of the piston, and means operable in a plurality of directions from a neutral position to move the piston inwardly in the cylinder.

2. A shock absorber comprising a cylinder and a piston therein, by-pass means around the piston head affording appreciable fluid resistance to inward movement only of the piston, means operable in a plurality of directions from a neutral position to move the piston inwardly in the cylinder, and spring means having no appreciable retarding effect on the inward movement of the piston but adapted to return the piston to outward position.

3. A shock absorber comprising a cylinder, a hollow piston mounted therein and having a restricted opening communicating with said cylinder, means for moving said piston in said cylinder, and means including a by-pass for conducting fluid from the interior of said piston to said cylinder.

4. A shock absorber comprising, in combination, a cylinder, a hollow piston mounted therein, a restricted opening formed in said piston and communicating with said cylinder, a plurality of openings formed in said cylinder, and means communicating with said openings for conducting oil from said openings to said cylinder.

5. A shock absorber comprising, in combination, a cylinder, a hollow piston mounted therein and having a restricted opening permitting the passage thereinto of fluid from said cylinder, said piston also having openings permitting the passage of fluid from said piston, and means for conducting the fluid from said last named openings to the portion of the cylinder below said piston.

6. A shock absorber comprising, in combination, a casing, a cylinder formed therein, a hollow piston mounted in said cylinder and having a restricted opening communicating therewith, said piston having an annular cut-away portion and having an opening communicating with the interior of the piston and with said cut-away portion, and means for conducting fluid from the cut-away portion of said piston through said casing to the lower portion of said cylinder.

7. A shock absorber comprising, in combination, a casing, a rock shaft journaled therein, a cylinder mounted in said casing, a hollow piston mounted in said cylinder and having air vents in the upper wall thereof and a restricted opening in the lower wall thereof, means for conducting fluid from the interior of said piston to the cylinder, and means carried by said rock shaft for actuating said piston.

8. A shock absorber comprising, in combination, a casing, a rock shaft journaled therein, a cylinder mounted in said casing, a hollow piston mounted in said cylinder and having air vents in the upper wall thereof and a restricted opening in the lower wall thereof, means for conducting fluid from the interior of said piston to the cylinder, and a plurality of means carried by said rock shaft for actuating said piston.

In testimony whereof I affix my signature.

LIONEL M. WOOLSON.